(12) United States Patent
Wilson et al.

(10) Patent No.: US 6,382,586 B1
(45) Date of Patent: May 7, 2002

(54) FLUSH VALVE ASSEMBLY WITH FLEX TUBE

(75) Inventors: John R. Wilson, Naperville, IL (US); Natan E. Parsons, Brookline, MA (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/735,442

(22) Filed: Dec. 14, 2000

(51) Int. Cl.[7] .............................................. F16K 31/12
(52) U.S. Cl. .................... 251/40; 251/30.03; 251/30.02
(58) Field of Search ............................... 251/28, 30.01, 251/30.02, 30.03, 40; 137/544, 550

(56) References Cited

U.S. PATENT DOCUMENTS

| | | | | |
|---|---|---|---|---|
| 4,793,588 A | * | 12/1988 | Laverty, Jr. ............... | 251/30.03 |
| 5,213,305 A | * | 5/1993 | Whiteside et al. .......... | 137/550 |
| 5,232,194 A | * | 8/1993 | Saadi et al. ................. | 251/120 |
| 5,335,694 A | * | 8/1994 | Whiteside .............. | 137/625.37 |
| 5,431,181 A | * | 7/1995 | Saadi et al. ............... | 137/15.11 |
| 5,887,848 A | * | 3/1999 | Wilson ........................ | 137/550 |
| 5,967,182 A | * | 10/1999 | Wilson ........................ | 137/544 |
| 6,182,689 B1 | * | 2/2001 | Lauer et al. ................. | 137/550 |
| 6,227,219 B1 | * | 5/2001 | Pino ............................... | 137/1 |
| 6,260,576 B1 | * | 7/2001 | Allen ........................ | 137/550 |

* cited by examiner

Primary Examiner—Philippe Derakshani
Assistant Examiner—D. Austin Bonderer
(74) Attorney, Agent, or Firm—Cook, Alex, McFarron, Manzo, Cummings & Mehler, Ltd.

(57) ABSTRACT

A toilet room flush valve includes a body having an inlet and an outlet. There is a valve seat between the inlet and outlet and a valve assembly is movable within the body and positioned to close upon the seat to control flow from the inlet to the outlet. A cover is mounted upon the body and defines a pressure chamber with the valve assembly. There is a bypass connecting the inlet and pressure chamber whereby the pressure therein maintains the valve assembly upon the seat. A flex tube is fixed relative to the cover at one end thereof, with the other end of the flex tube being attached to the valve assembly remote from the pressure chamber. There is a passage in the flex tube opening to the body outlet at one end thereof. A vent passage connects the pressure chamber with the flex tube passage and a pilot controls flow through the vent passage. Movement of the valve assembly toward the cover in response to venting of the pressure chamber causes the flex tube to bend while remaining stationary relative to the cover. A filter is attached to the flex tube and controls the flow of water from the pressure chamber to the vent passage.

14 Claims, 4 Drawing Sheets

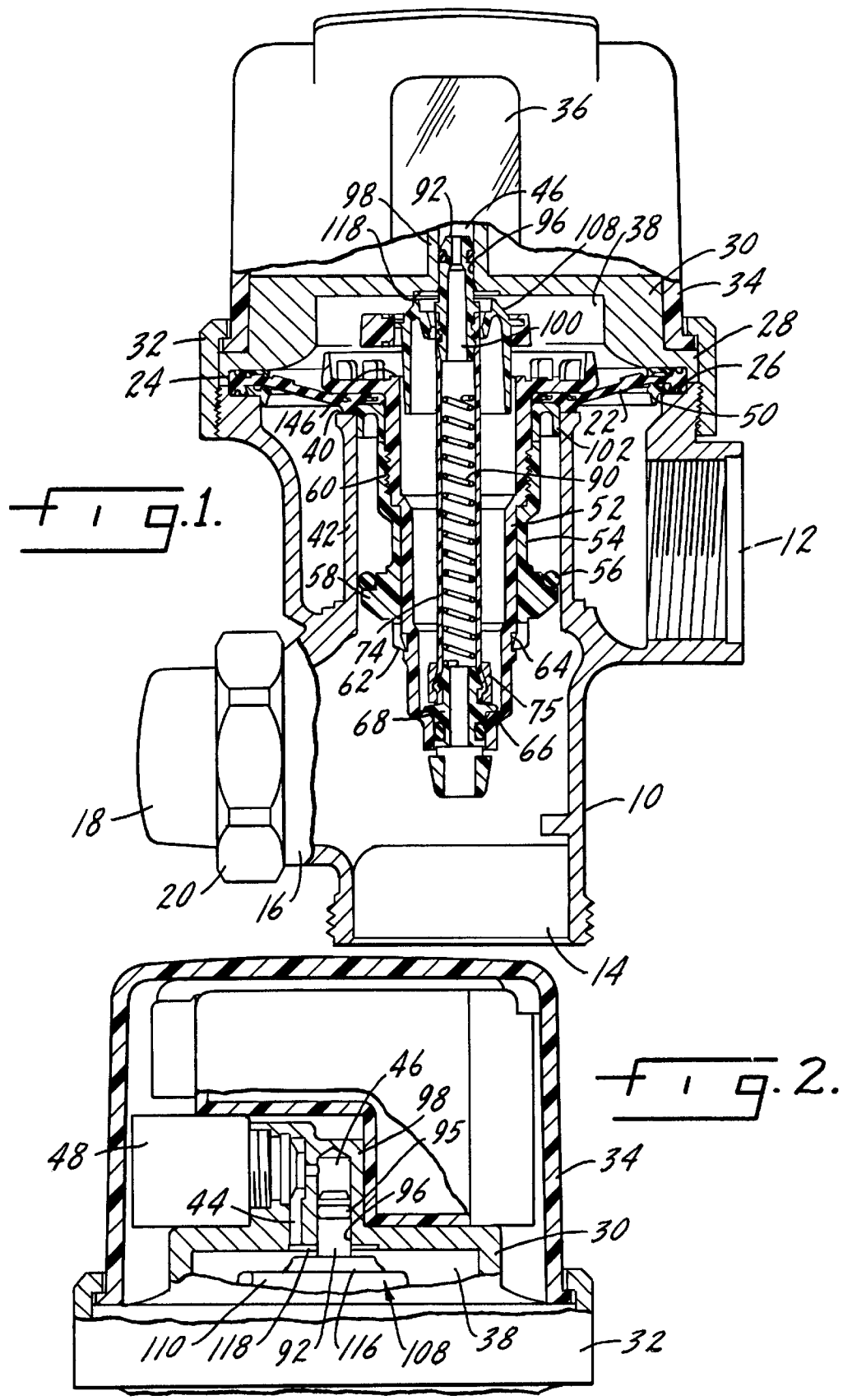

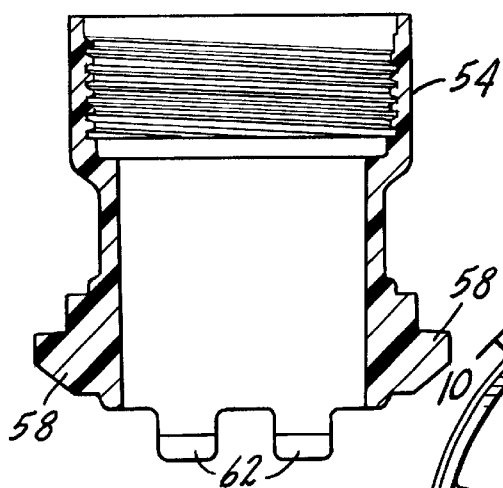
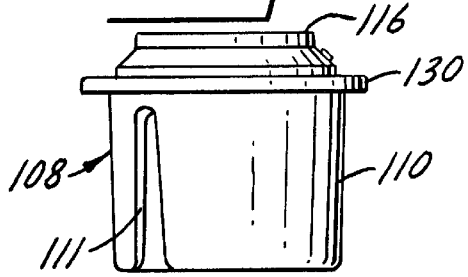
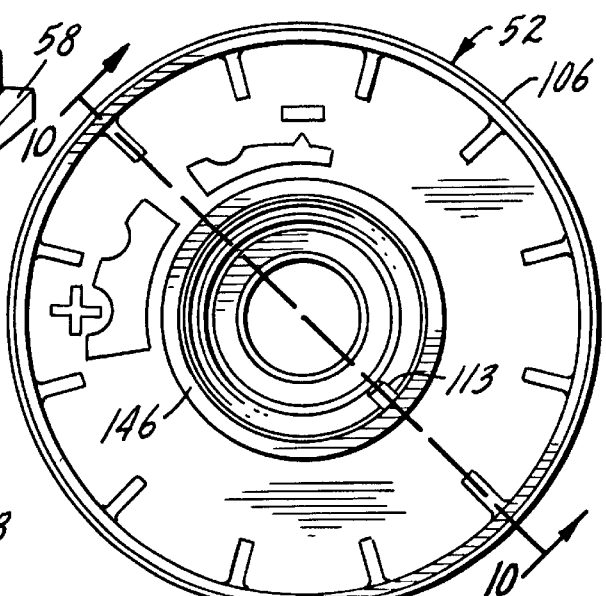
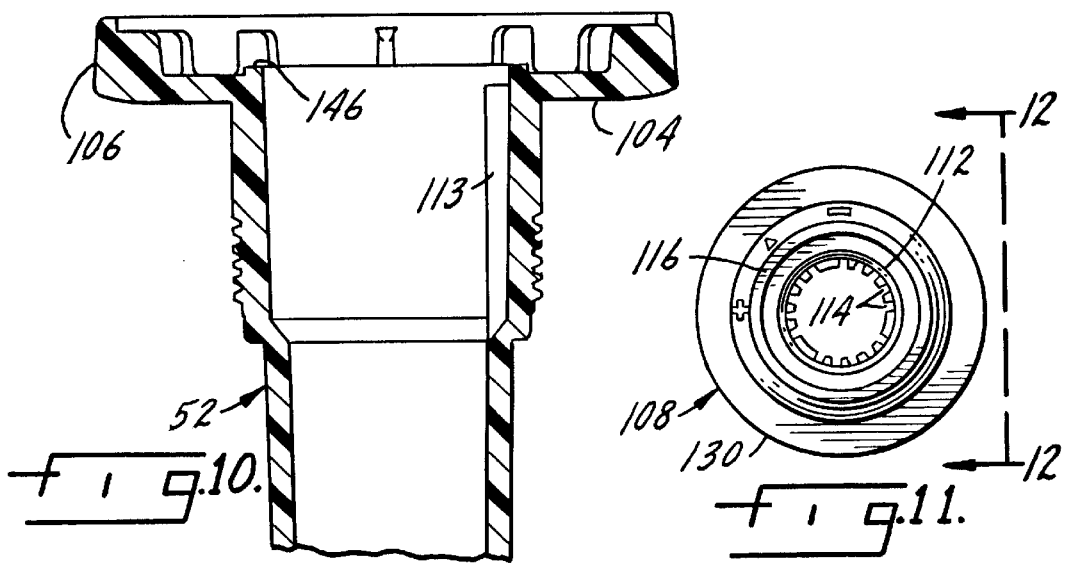
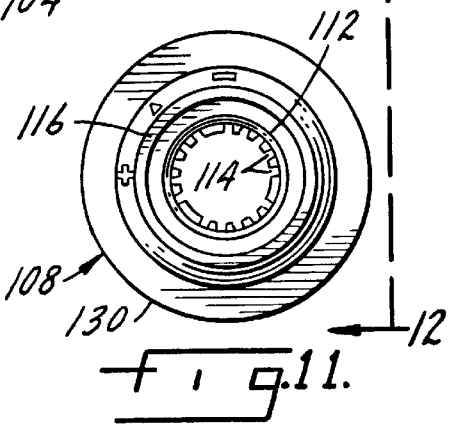

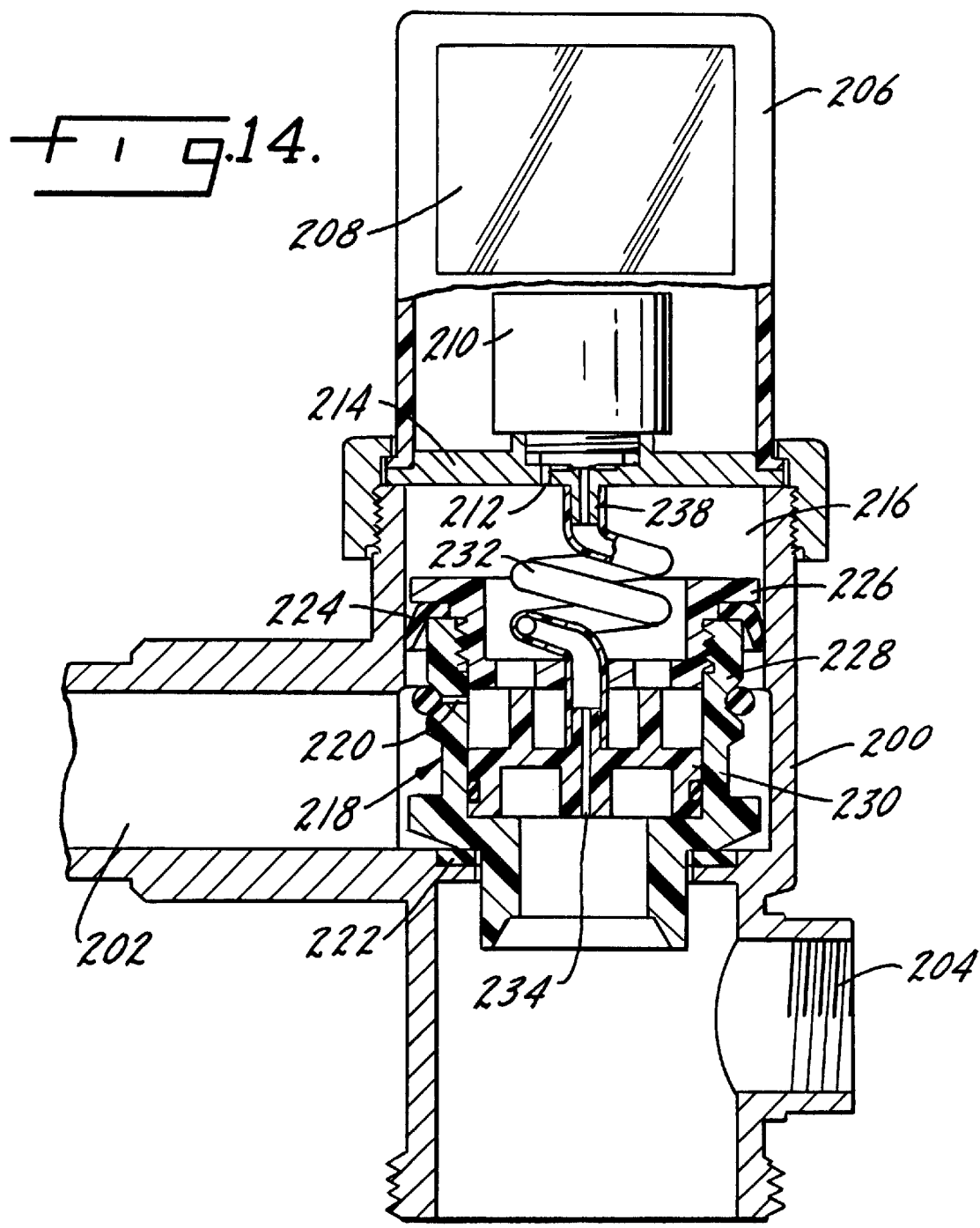

FLUSH VALVE ASSEMBLY WITH FLEX TUBE

FIELD OF THE INVENTION

The present invention relates to flush valves of the type generally shown in U.S. Pat. No. 5,244,179, owned by the assignee of the present application, Sloan Valve Company of Franklin Park, Ill. More particularly, the present invention relates to an improvement upon the flush valve of the '179 patent which eliminates a dynamic seal located at the top of the diaphragm assembly. In addition, the present invention provides a filter for water passing to the solenoid controlled vent passage connecting the pressure chamber in the flush valve to the outlet. The filter is necessary to remove dirt and other particles which may inhibit operation of the valve. Elimination of the dynamic seal prevents leakage of the water from the pressure chamber.

SUMMARY OF THE INVENTION

The present invention relates to toilet room flush valves and in particular to improvements in such flush valves to prevent leakage through a seal positioned within the cover of the flush valve assembly.

Another purpose of the invention is to provide a solenoid operated flush valve of the type described which includes a water filter connecting the pressure chamber of the flush valve to the vent passage, which filter eliminates the potential for dirt and other impurities from clogging the flush valve vent passage.

Another purpose of the invention is to provide a flush valve assembly of the type described in which the filter cooperates in controlling the stroke of the flush valve diaphragm.

Other purposes will appear in the ensuing specification, drawings and claims.

DESCRIPTION OF THE DRAWINGS

The invention is illustrated diagrammatically in the following drawings wherein:

FIG. 1 is a partial section through a flush valve showing the present invention as viewed from the front;

FIG. 2 is a partial section through the upper portion of the flush valve with portions of the cover removed;

FIG. 8 is an axial section of the flush valve guide;

FIG. 9 is a top view of the flush valve disc;

FIG. 10 is a section along plane 10—10 of FIG. 9;

FIG. 11 is a top view of the adaptor guide and filter;

FIG. 12 is a side view along plane 12—12 of FIG. 11;

FIG. 13 is a bottom view of the adaptor guide and filter of FIGS. 11 and 12; and FIG. 14 is a partial section through a second embodiment of flush valve showing the present invention.

DESCRIPTION OF THE PREFERRED EMBODIMENT

Figure 3:
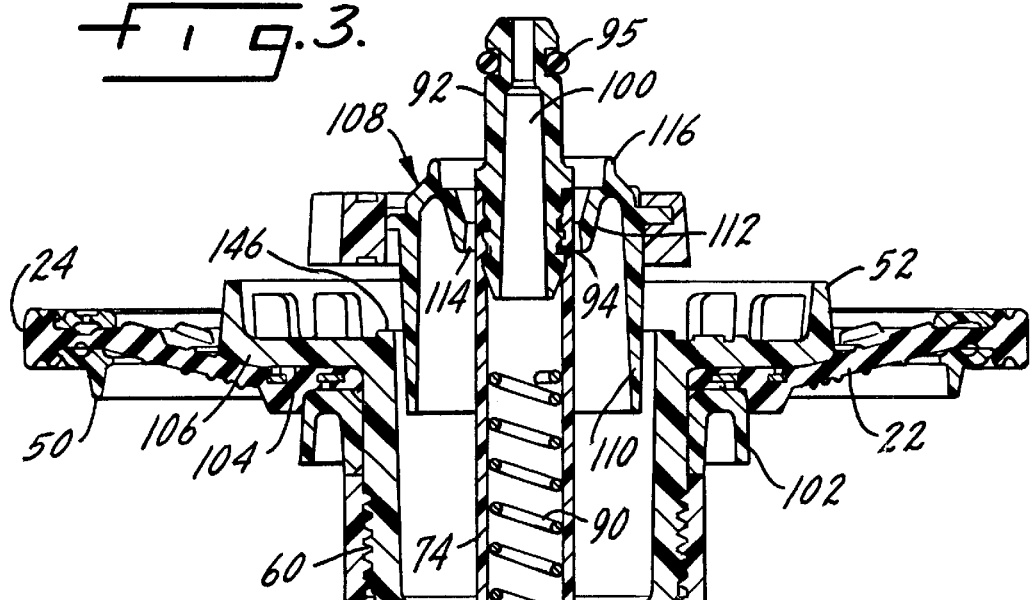
FIG. 3 is an axial section of the diaphragm assembly and flex tube assembly.
Figure 4:
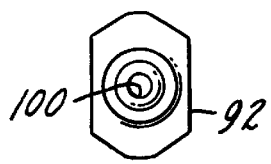
FIG. 4 is a top view of the inner cover adaptor.

In the flush valve shown in U.S. Pat. No. 5,244,179, the disclosure of which is incorporated herein by reference, there is a dynamic seal at the top of the diaphragm assembly where it extends into the cover, and the seal has at times been the cause of water leaking from the flush valve pressure chamber. Also, it has been possible in the flush valve of the '179 patent for the solenoid controlled pressure chamber vent passage to clog to the point that this passage may not be free to properly vent the pressure chamber. The present invention is directed to solving the above-described concerns with flush valve operation. The invention will be described in the context of a diaphragm-type flush valve and a piston-type flush valve, but it has wider application. Further, although the pilot valve mechanism shown in the two embodiments described is in the form of a solenoid, either conventional or bi-stable, the invention should not be so limited, as other pilot valve mechanisms such as hydraulic, pushbutton, or other mechanical means may also be suitable.

The invention will be described in connection with a battery operated solenoid flush valve of the type sold by Sloan Valve Company under the trademark OPTIMA. The invention has wider application and is usable in any flush valve in which a pressure chamber is vented through a pilot valve mechanism and the primary flow control assembly moves off of its seat to control flow through the flush valve.

In FIG. 1, the flush valve body is indicated at 10 and may have an inlet opening 12 and a bottom directed outlet opening 14. There is a boss 16 at the left side of outlet 14 and this normally is the location of the flush valve manual handle. However, in the present instance, a cap 18 may close this opening and may be held in position by a lock ring 20. The valve shown is of the type sold by Sloan Valve Company under the trademark ROYAL and thus uses the diaphragm to control flow between the inlet and the outlet. The diaphragm is indicated at 22 and is held at its periphery 24 on a shoulder 26 of the body 10 by a flange 28 of an inner cover 30. A threaded lock ring 32 holds the above-described assembly and an outer cover 34 which will contain the solenoid, an infrared sensor and the associated battery and electronics to operate the sensor. The sensor window is indicated at 36 in FIG. 1.

The area between the underside of the inner cover 30 and the upper side of the diaphragm 22 forms a pressure chamber 38. The pressure of the water within this chamber holds the diaphragm 22 upon a seat 40 formed at the upper end of barrel 42 which forms a conduit between the inlet 12 and the outlet 14.

As shown in FIG. 2, there is a vent passage 44 in the upper cover which connects to pressure chamber 38 and a chamber 46 in the upper cover, with the flow of water between the vent passage 44 and the chamber 46 being controlled by a solenoid 48. Details of this operation are disclosed in the '179 patent, as well as in U.S. Pat. Nos. 4,309,781 and 4,793,588.

Water flow through the inlet 12 reaches the pressure chamber 38 through a filter and bypass ring 50, the details of which are disclosed in U.S. Pat. No. 5,967,182. Thus, water from the flush valve inlet reaches the pressure chamber 38, to maintain the diaphragm in a closed position, and the pressure chamber will be vented by the operation of the solenoid as water will flow upwardly through passage 44, then into chamber 46 and then through the passage in the flex tube to be described hereinafter.

The diaphragm assembly includes the diaphragm which, in its closed position, will rest upon the seat 40 and a disc 52 shown in more detail if FIG. 3. The disc 52 is threadedly attached to a guide 54 which carries a flow control ring 56 which is adjacent the interior of the barrel 42. Directly below the control ring 56, the guide includes four arcuate projections 58 which support ring 56.

In addition to the threaded connection 60 between the guide 54 and the disc 52, the guide carries pairs of inwardly directed barbs 62, annular in form, which extend within a recess 64 in the exterior of the disc to lock these two elements in an assembled and fixed position.

Figures 5, 6:
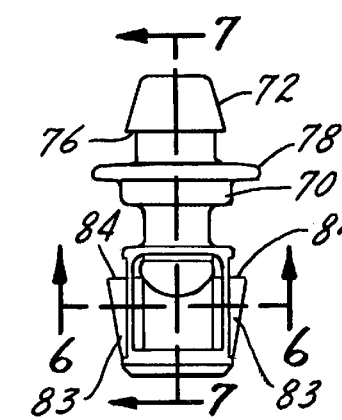
FIG. 5 is a side view of the lower flex tube adaptor.
FIG. 6 is a section along plane 6—6 of FIG. 5.
Figure 7:
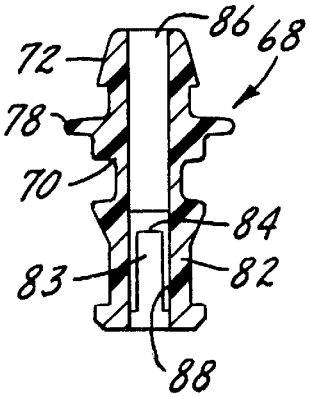
FIG. 7 is a section along plane 7—7 of FIG. 5.

At the lower end of the guide 54, there is an inwardly directed shoulder 66, which functions to support a lower flex tube adaptor 68, illustrated in detail in FIGS. 5–7. The adaptor 68 includes a body 70 and an upwardly directed nose 72, which will extend into and secure the lower end of a flex tube 74. A snap ring 75 may surround this joint for added security. The nose 72 has a barb 76 which deforms the flex tube and functions to positively hold the lower end of the flex tube to the adaptor. The body 70 includes an outwardly directed flange 78, which rests upon the inwardly directed shoulder 66 of the guide and there is a seal ring 80, which is located within an outwardly facing groove in the adaptor and bears against the interior of the guide.

A portion 82 of the adaptor 68 extends outwardly from the guide and has a pair of locking tabs 83, with an upper shoulder 84 slightly spaced from the lower end of the guide in the position of FIGS. 1 and 3, to thereby effectively hold the adaptor 68 to the lower end of the guide, with only minimal movement permitted. The adaptor 68 has a central water passage 86 which communicates with a central passage 88 in the portion 82 of the adaptor. Thus, any water flowing down through the flex tube 74, will pass out of the adaptor and be directed towards the flush valve outlet 14.

The flex tube 74, which is hollow and in the form of a flexible sleeve, contains a coiled spring 90, which prevents the tube from collapsing due to water pressure flowing downwardly through the disc 52. At its upper end, the flex tube 74 is attached to an inner cover adaptor 92. The adaptor 92 may have one or more outwardly extending projections 94, which interact with and may deform the interior of the flex tube wall to secure the adaptor in position. The upper nose of the adaptor 92 is tapered and has an O-ring 95, which forms a seal with an interior wall 96, in an extension 98 of the inner cover 30. This is particularly shown in FIGS. 1 and 2. The adaptor 92 thus extends within the chamber 46 and forms part of the fluid connection from the chamber 46, down through the interior passage 100 of the adaptor and into the interior of the flex tube 74 through which water flows, from the pressure chamber 38, to the flush valve outlet 14.

Seated on top of the upper end of the guide 54, is a refill head 102 with the diaphragm 22 being captured between the upper surface of the refill head and a lower surface 104 of a radially outwardly extending portion 106 of the disc 52. The diaphragm, disc 52 and guide 54, will all move together when pressure is relieved in chamber 38 and the diaphragm moves upwardly to provide a direct connection between flush valve inlet 12 and flush valve outlet 14. When this takes place, the disc 52 will move up and will carry with it the lower end of the flex tube 74. Thus, the flex tube must bend as its upper end is fixed within the passage 96 of the inner cover 30.

A filter is indicated generally at 108 and is shown in detail in FIGS. 11–13. The filter 108 includes a downwardly extending guide portion 110, which is used to maintain axial alignment with the interior of the disc 52 when these elements move relative to each other. During flush valve operation the filter 108 is prevented from rotating in relation to the disc 52 by a slot 111 in the guide extension 110 and an internal projection 113 in the disc 52. The filter 108 has an inwardly extending boss 112, within which there are formed a plurality of filter grooves 114, shown in particular in FIGS. 3 and 13. These grooves form a filter to remove impurities in the water flowing from the pressure chamber 38 into the passage 44 controlled by operation of the solenoid. There is an upwardly extending annular projection 116 on the filter, which will extend into a small recess 118 in the lower side of the inner cover and the passage 44 opens into this recess. The filter prevents water from flowing directly from the pressure chamber 38 into the passage 44, and forces the flow of water from the pressure chamber to pass through the described filter grooves 114.

There are means for adjustment of the stroke of the diaphragm assembly when moving from the closed position of FIG. 1 to an open position. The stroke determines the time to fill pressure chamber 38 through bypass 50 and thus, the volume of water which will flow through the flush valve before the diaphragm returns to the closing position of FIG. 1. The stroke is determined by the distance between the lower surface of flange 130 and projection 146 on the guide 52. This distance may be varied by changing the thickness of flange 130, the height of projection 146, or by the use of supplemental washers in varying thickness.

FIG. 14 shows the concept of a flexible tube connected at one end to a pilot valve, for example a solenoid, and at the other end to a movable valve assembly, in this case a piston-operated flush valve. The concepts described in connection with FIGS. 1–13 are equally applicable to the FIG. 14 embodiment.

In FIG. 14, which shows a piston-type flush valve of the type disclosed in U.S. Pat. No. 5,881,983, the disclosure of which is herein incorporated by reference, there is a valve body 200 having a water inlet 202 and a water outlet 204. There is an upper cover 206 which may have a window 208, similar to the window 36 shown in the FIG. 1 embodiment. A solenoid is indicated at 210 and controls flow through a water passage 212 in an inner cover 214, which passage vents a pressure chamber 216.

The valve assembly includes a movable piston shown generally at 218 which receives water from the inlet 202 through a bypass 220, which is described in detail in the above-mentioned '993 patent. Water from the bypass 220 will reach the pressure chamber 216 and hold the piston assembly 218 upon its seat 222, thus closing communication between the inlet 202 and the outlet 204.

The piston assembly 218 includes a lip seal 224 which bears against the internal wall of the body 200, with the lip seal being carried by an insert 226 threadedly engaged with the piston 228 of the piston assembly 218.

An adaptor 230 is mounted within the piston 228 and supports the lower end of a coiled flex tube 232. The adaptor 230 may have a passage 234 which connects with the interior of the flex tube so as to vent water from the pressure chamber 216. The upper end of the flex tube 232 is mounted on a boss 238 forming a part of the inner cover 214 upon which the solenoid 210 is mounted. Operation of the solenoid is effective to connect the passage 212 with the passage 238, thereby venting the pressure chamber 216 in the manner described in the embodiment of FIGS. 1–13.

The flex tube 232 functions in the same manner as the FIG. 1 embodiment and may include a spring therein, although this is not necessary. As the piston assembly 218 moves upward, in response to a venting of the pressure chamber 216, the tube will tend to collapse as its upper end is fixed, whereas, the lower end is attached to the movable piston assembly.

Of particular importance in the invention is the utilization of a flexible tube to eliminate a dynamic seal located at the top of the valve assembly, whether it be a diaphragm or piston-type flush valve. Although not shown in the FIG. 14 embodiment, a filter may be provided in the inner cover 214, which will function in a like manner as the filter described in the FIG. 1 embodiment.

Whereas the preferred form of the invention has been shown and described herein, it should be realized that there may be many modifications, substitutions and alterations thereto.

What is claimed is:

1. A toilet room flush valve Including a body having an inlet and an outlet, a valve seat between said inlet and outlet, a valve assembly in said body positioned to close upon said seat to control flow from said inlet to said outlet, a cover mounted upon said body and defining a pressure chamber with said valve assembly, bypass means connecting said inlet and pressure chamber whereby the pressure in said chamber maintains said valve assembly upon said seat, a flexible member fixed relative to said cover at one end thereof, the other end of said flexible member being attached to said valve assembly, a passage in said flexible member opening to said outlet at one end thereof, a vent passage connecting said pressure chamber with said flexible member passage, a pilot mechanism controlling flow through said vent passage, movement of said valve assembly toward said cover, in response to venting of said pressure chamber causing said flexible member to bend while remaining stationary relative to said cover.

2. The flush valve of claim 1 wherein said flexible member extends into said cover, a seal between said flexible member and cover, said seal remaining stationary during movement of said diaphragm assembly.

3. The flush valve of claim 2 wherein said flexible member is a hollow tube.

4. The flush valve of claim 3 including a spring positioned within said tube.

5. The flush valve of claim 4 wherein said spring is a coiled spring.

6. The flush valve of claim 1 wherein said body includes a conduit connecting said inlet and outlet, said valve assembly including guide means remote from said pressure chamber and movable within said conduit to guide movement of said valve assembly, said flexible member being attached to said guide means.

7. The flush valve of claim 6 wherein said guide means has a chamber therein in communication with said pressure chamber, said flexible member extending through said guide means chamber.

8. The flush valve of claim 1 including a filter in said pressure chamber positioned to filter water passing from said pressure chamber into said vent passage.

9. The flush valve of claim 8 wherein said filter is attached to said flexible member.

10. The flush valve of claim 9 wherein said filter includes a plurality of openings connecting said pressure chamber and said vent passage.

11. The flush valve of claim 8 wherein said valve assembly includes an upwardly directed stop positioned to contact said filter to limit movement of said diaphragm assembly.

12. The flush valve of claim 1 wherein said valve assembly includes a diaphragm.

13. The flush valve of claim 1 wherein said pilot mechanism includes a solenoid.

14. The flush valve of claim 1 wherein said valve assembly includes a movable piston.

* * * * *

UNITED STATES PATENT AND TRADEMARK OFFICE
CERTIFICATE OF CORRECTION

| | | |
|---|---|---|
| PATENT NO. | : 6,382,586 B1 | Page 1 of 1 |
| DATED | : May 7, 2002 | |
| INVENTOR(S) | : Wilson et al. | |

It is certified that error appears in the above-identified patent and that said Letters Patent is hereby corrected as shown below:

<u>Title page,</u>
Item [73], should read
-- [73] Assignees: Sloan Valve Company, Franklin Park, IL (US)
                Arichell Technologies, Inc., West Newton, MA (US) --

Signed and Sealed this

Fourteenth Day of October, 2003

JAMES E. ROGAN
*Director of the United States Patent and Trademark Office*